United States Patent
Shimazu et al.

(10) Patent No.: US 11,791,758 B2
(45) Date of Patent: Oct. 17, 2023

(54) INVERTER DEVICE AND MOTOR DEVICE COMPRISING SAME

(71) Applicant: NIDEC ELESYS CORPORATION, Kanagawa (JP)

(72) Inventors: Satoshi Shimazu, Kanagawa (JP); Yuhi Nakada, Kanagawa (JP)

(73) Assignee: NIDEC ELESYS CORPORATION, Kanagawa (JP)

( * ) Notice: Subject to any disclaimer, the term of this patent is extended or adjusted under 35 U.S.C. 154(b) by 0 days.

(21) Appl. No.: 17/715,013

(22) Filed: Apr. 6, 2022

(65) Prior Publication Data

US 2022/0329192 A1  Oct. 13, 2022

(30) Foreign Application Priority Data

Apr. 9, 2021  (CN) .......................... 202110381414.3

(51) Int. Cl.
  *H02P 27/08*  (2006.01)
  *H02P 27/06*  (2006.01)
  *H02P 29/032*  (2016.01)

(52) U.S. Cl.
  CPC ............ *H02P 27/06* (2013.01); *H02P 29/032* (2016.02)

(58) Field of Classification Search
  CPC ........ H02P 27/06; H02P 29/032; H02P 29/10; H02M 7/53871
  See application file for complete search history.

(56) References Cited

U.S. PATENT DOCUMENTS 10,351,002 B2 * 7/2019 Saha .......................... B60L 3/04
2017/0305274 A1 * 10/2017 Saha ....................... B60L 3/003

FOREIGN PATENT DOCUMENTS

JP  2005033932  2/2005
WO  2016076429  5/2016

* cited by examiner

*Primary Examiner* — Muhammad S Islam
(74) *Attorney, Agent, or Firm* — JCIPRNET

(57) ABSTRACT

An inverter device is provided. The inverter device converts power from a power source and drives a motor. The inverter device includes an inverter circuit having a switch, a driver circuit that switches the switch on and off, and a controller that controls the driver circuit. The controller has a speed calculator used to calculate a minimum speed of the motor based on a power source voltage. After the controller performs fail-safe control, when a speed of the motor is less than the minimum speed, the fail-safe control is ended.

6 Claims, 4 Drawing Sheets

INVERTER DEVICE AND MOTOR DEVICE COMPRISING SAME

CROSS REFERENCE TO RELATED APPLICATIONS

The present invention claims priority under 35 U.S.C. § 119 to Chinese Application No. CN202110381414.3 filed on Apr. 9, 2021, the entire content of which is incorporated herein by reference.

FIELD OF THE INVENTION

The disclosure relates to an inverter device and a motor device including the inverter device, and in particular, relates to an inverter device including a speed calculator used to calculate a minimum speed of a motor.

BACKGROUND

Conventionally, when the normal torque control is to be stopped while the motor is rotating, the fail-safe control is performed in order to prevent overcharging of the power source and damage to the insulated-gate bipolar transistors (IGBTs) due to the counter-electromotive force (CEMF).

In the related art, in order to trigger the fail-safe control, a method of setting the speed threshold is disclosed. To be specific, in the fail-safe control provided by the related art, when an abnormality occurs in the motor device (i.e., the motor power source voltage becomes abnormally high), the fail-safe control is performed according to the speed of the motor at the time of the abnormality. Since the possibility of abnormality of other components is high when the speed of the motor is high, it is possible to perform the fail-safe control only by monitoring the speed of the motor. For instance, the fail-safe control is started when the fixed speed is equal to 4,000 rpm or greater, the fail-safe control is ended when the fixed speed is equal to 3,000 rpm or lower, and the normal torque control is then started.

For instance, a technical solution of starting the fail-safe control according to the speed of the motor when the motor device is abnormal is disclosed. To be specific, in the inverter control device, when it is detected that the speed becomes zero, a signal to stop the fail-safe control is notified to the vehicle side. Herein, the fail-safe control includes the active short circuit (ASC) control and the shut down (SD) control. In the case of the ASC control, the ASC minimum speed ωasc is set according to the deceleration of the vehicle and the temperature of the stator coil. In the case of the SD control, the SD maximum speed ωsd is set according to the magnitude of the power source current in the relay-on state and the increase in the direct current (DC) link voltage in the relay-off state.

For instance, a motor control device that switches between the ASC control and the SD control according to the speed is disclosed. To be specific, in the motor control device, the fail-safe control is stopped when it is detected that the speed becomes zero, and the SD control in the fail-safe control continues when the speed is not zero.

In the related art, the speed that does not require the fail-safe control is determined as a fixed value in advance, and when the speed of the motor is lower than the predetermined fixed value, the fail-safe control is ended. Therefore, even if the fail-safe control is not actually required, the fail-safe control continues as long as the speed does not fall below the determined fixed value.

SUMMARY

In the first aspect of an inverter device provided by the disclosure, and the inverter device converts power from a power source and drives a motor. The inverter device includes an inverter circuit having a switch, a driver circuit that switches the switch on and off, and a controller that controls the driver circuit. The controller has a speed calculator used to calculate a minimum speed of the motor based on a power source voltage. After the controller performs fail-safe control, when a speed of the motor is less than the minimum speed, the fail-safe control is ended.

According to the inverter device provided by the disclosure, by comparing the speed of the motor with the minimum speed, the fail-safe control is ended when the speed of the motor is lower than the minimum speed. In this way, a speed range of the motor in which the fail-safe control is performed is narrowed, and the fail-safe control is thus prevented from being excessively executed.

The second aspect of the inverter device provided by the disclosure is included in the first aspect, and preferably, the speed calculator calculates a maximum speed of the motor based on the power source voltage, and when the speed of the motor is greater than the maximum speed, the controller performs the fail-safe control.

According to the inverter device provided by the disclosure, by comparing the speed of the motor with the maximum speed, the fail-safe control is ended when the speed of the motor is greater than the maximum speed. In this way, the speed range of the motor in which the fail-safe control is performed is narrowed, and the fail-safe control is thus prevented from being excessively executed.

The third aspect of the inverter device provided by the disclosure is included in the first aspect, and preferably, the speed calculator calculates the maximum speed and the minimum speed according to the power source voltage, a correction coefficient, and an offset value.

The fourth aspect of the inverter device provided by the disclosure is included in the third aspect, and preferably, the correction coefficient and the offset value are fixed values that vary depending on types of the motor and the power source.

According to the inverter device provided by the disclosure, the maximum speed and the minimum speed of the motor are calculated based on the power source voltage, the correction coefficient, and the offset value. Further, the correction coefficient and the offset value are fixed values that vary depending on types of the motor and the power source. Therefore, by pre-storing in a table, the maximum speed and the minimum speed of the motor are obtained.

The fifth aspect of the inverter device provided by the disclosure is included in the first aspect, and preferably, the inverter circuit includes an upper arm side switch group and a lower arm side switch group. The controller controls the driver circuit to switch on and to switch off the upper arm side switch group and the lower arm side switch group.

The sixth aspect of a motor device provided by the disclosure is included in the fifth aspect, and preferably, the fail-safe control is active short circuit (ASC) control in which one of the upper arm side switch group and the lower arm side switch group is turned on in all phases and the other is turned off in all phases.

The seventh aspect of the motor device provided by the disclosure is included in the fifth aspect, and preferably, the fail-safe control is short circuit (SD) control in which both the upper arm side switch group and the lower arm side switch group are turned off in all phases.

When the motor rotates at a high speed, the motor overheats. When the speed of the motor is reduced by the ASC control so that the motor rotates at a low speed, the motor is suddenly brought into a state where a brake torque is applied. According to the inverter device provided by the disclosure, the fail-safe control (ASC control or SD control) is performed when the motor rotates at a high speed, and failure of the switches and the power source is prevented from occurring in this way.

In the eighth aspect of the motor device provided by the disclosure, the inverter device according to any one of the first aspect is included.

The above and other elements, features, steps, characteristics and advantages of the present disclosure will become more apparent from the following detailed description of the preferred exemplary embodiments with reference to the attached drawings.

DESCRIPTION OF THE EMBODIMENTS

Figure 1:
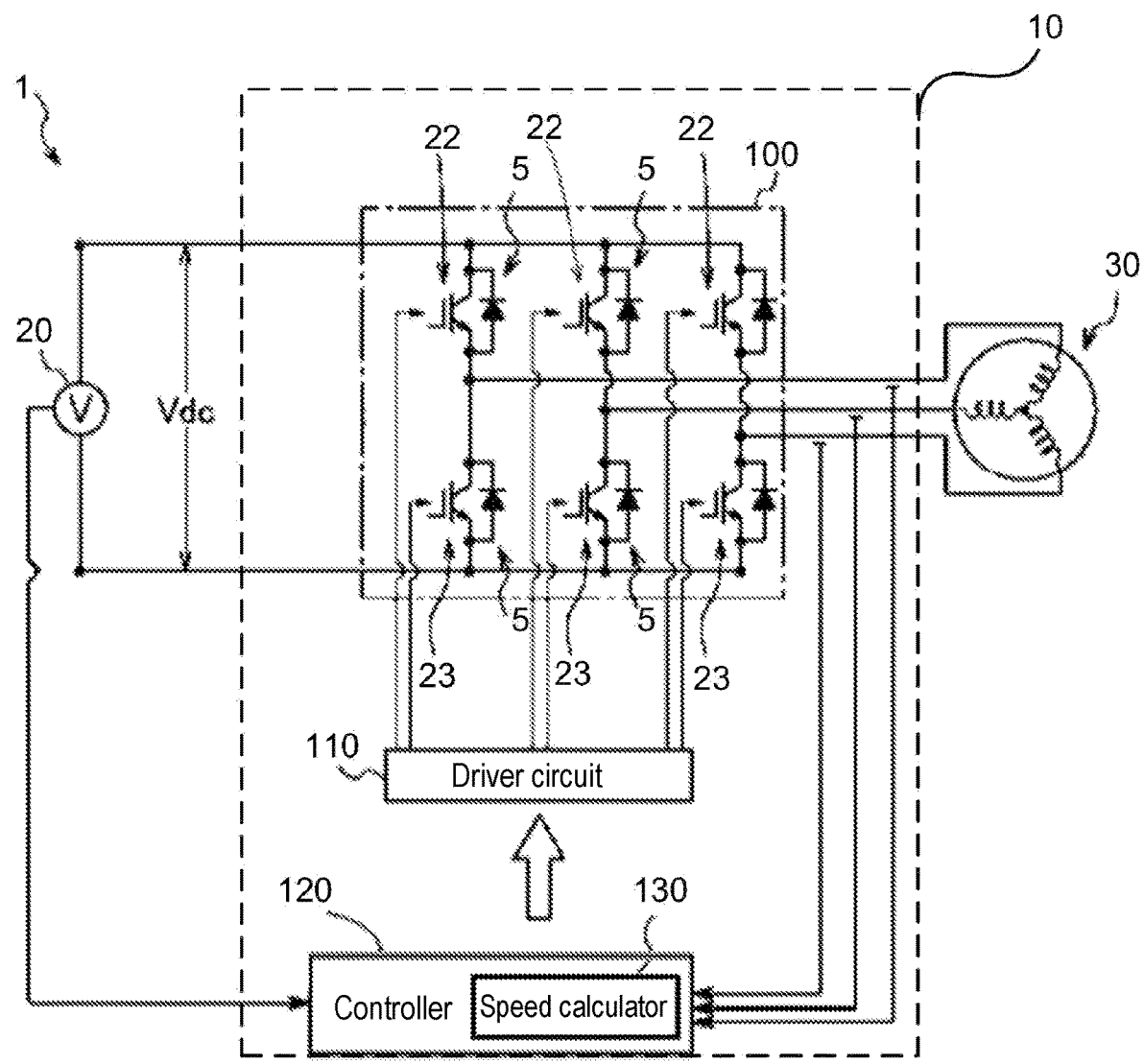
FIG. 1 is a schematic diagram illustrating a structure of a motor device having an inverter device according to the disclosure.

Hereinafter, preferred exemplary embodiments of an inverter device 10 according to the disclosure are described with reference to the drawings. In the drawings, the same or corresponding parts are denoted by the same reference numerals.

FIG. 1 is a schematic diagram illustrating a structure of a motor device 1 according the disclosure. As an example, the motor device 1 provided by the disclosure includes: a direct current (DC) power source 20, a motor 30, and the inverter device 10.

As shown in FIG. 1, the motor 30 has a rotor and a stator, and is a motor that is rotationally driven by being supplied of three-phase alternating current (AC) power. For instance, the motor 30 may employ a permanent magnet synchronous motor.

As shown in FIG. 1, the DC power source 20 is, for example, a high-voltage battery. But the DC power source 20 is not limited to a high-voltage battery and may be other power source devices having DC voltages.

The motor 30 to be driven by the inverter device 10 is, for example, an electric rotating machine that acts as a driving force source for wheels in vehicles such as a hybrid vehicle and an electric vehicle. In this exemplary embodiment, the case where the motor 30 is the driving force source of the wheels in such a vehicle is described as an example, but the application of the motor 30 is not limited thereto. The motor 30 is an electric rotating machine that performs a three-phase AC operation, and may function as an electric motor and may also function as a generator. That is, the motor 30 converts electric power from the DC power source 20 into power via the inverter device 10 (power running mode). Alternatively, the motor 30 converts a rotational driving force transmitted from a combustion engine (not shown) and the wheels into electric power, and charges the DC power source 20 via the inverter device 10 (regenerative mode).

As shown in FIG. 1, the inverter device 10 includes an inverter circuit 100, a driver circuit 110, and a controller 120 used to control the driver circuit 110, converts DC power stored in the DC power source 10 into three-phase AC power, and supplies the converted three-phase AC power to the motor 30 to accordingly drive the motor 30. Herein, the controller 120 has a speed calculator 130 used to calculate a minimum speed of the motor 30 based on a power source voltage Vdc of the DC power source 20. Further, after the controller 230 performs fail-safe control, when a speed of the motor 30 is less than the minimum speed, the fail-safe control is ended.

As shown in FIG. 1, the speed calculator 130 calculates a maximum speed and the minimum speed of the motor 30 by using the following equation (1) according to the power source voltage, a correction coefficient, and an offset value. In this way, excessive charging of the DC power source is prevented.

$$\text{speed } X, Y \text{ (rpm)} = \text{power source voltage (V)} \times \text{correction coefficient (rpm/V)} + \text{offset value (rpm)} \quad \text{(equation 1)}$$

In addition, since the DC power source is charged when a counter-electromotive force (CEMF) is greater than the power source voltage, in order to prevent unnecessary charging of the DC power source, the correction coefficient and the offset value are set so that the CEMF is less than the power source voltage in the disclosure.

Further, in the disclosure, the speed calculator 120 of the controller calculates the minimum speed of the motor 30 based on the power source voltage. Further, after the controller 230 performs the fail-safe control, when the speed of the motor 30 is less than the minimum speed, the fail-safe control is ended. In this way, compared to setting the minimum speed with a fixed value, a speed range of the motor in which the fail-safe control is performed is narrowed, and the fail-safe control is thus prevented from being excessively executed.

In addition, the speed calculator 130 calculates the maximum speed of the motor based on the power source voltage, and when the speed of the motor 30 is greater than the maximum speed, the controller 120 performs the fail-safe control. In this way, the power source and the motor are prevented from being damaged, and a brake torque is also prevented from being generated.

Further, the specific operation of the fail-safe control, such as the specific operation of active short circuit (ASC) control and shut down (SD) control, is to be described in detail in the following paragraphs.

As shown in FIG. 1, the inverter circuit 100 is arranged between the DC power source 20 and the motor 30 and is a power conversion device used to convert power between the DC power and the three-phase AC power. The inverter circuit 100 is defined by a series circuit defined by an upper arm side switch group 22 and a lower arm side switch group 23. Herein, the upper arm side switch group 22 includes a plurality of (e.g., 3) switches, and the lower arm side switch group 23 includes a plurality of (e.g., 3) switches as well. In addition, a diode 5 is connected in parallel to each switch. Generally, each switch is an insulated-gate bipolar transistor (IGBT) switch, and the diode 5 is a flyback diode, but neither is limited thereto.

In the following, based on the chart shown in FIG. 2, a control process of the inverter circuit 100 provided by the disclosure is described.

Figure 2:
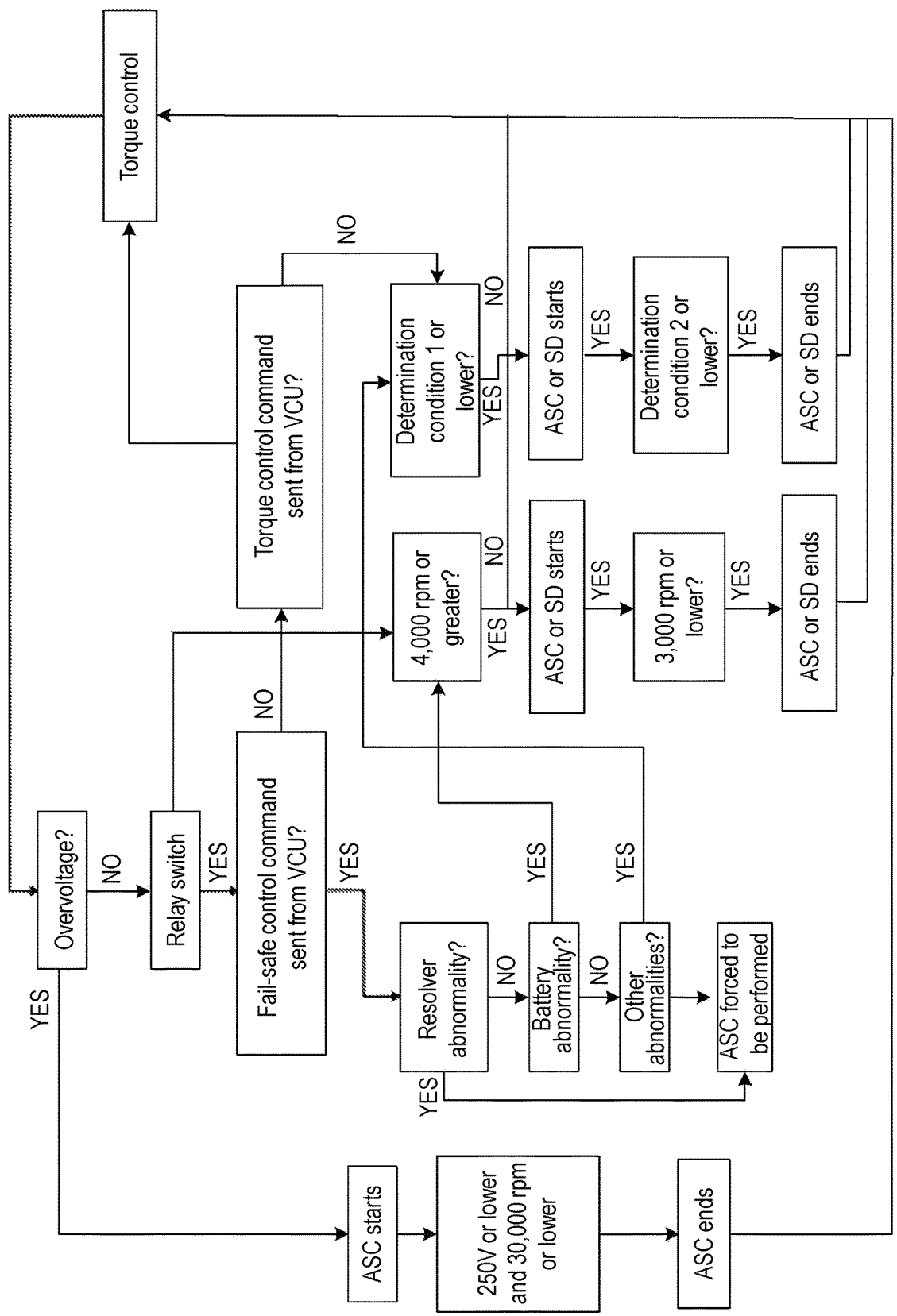
FIG. 2 is a chart illustrating a control process of the inverter device according to the disclosure.

As shown in FIG. 2, first, it is determined whether or not a voltage state of the DC power source 20 is an overvoltage state. When it is determined that the voltage state of the DC power source 20 is an overvoltage state, e.g., 540 V or greater, the inverter circuit 100 starts ASC control so that the inverter circuit 100 enters an overvoltage ASC state. When it is determined that the voltage state of the DC power source 20 is not an overvoltage state, e.g., returns to 250V or lower, or when it is determined that the speed of the motor 30 is 3,000 rpm or lower, the inverter circuit 100 then ends the ASC control.

As described above, when it is determined that the voltage state of the DC power source 20 is the overvoltage state, the inverter circuit 100 starts the ASC control, and in this case, it is then determined whether the voltage state of the motor 30 is a battery relay state.

When it is determined that the voltage state of the motor 30 is in the battery relay state, a fail-safe control command is sent from a vehicle control unit (VCU), and the high-voltage battery is abnormal, the inverter circuit 100 starts the fail-safe control so that the inverter circuit 100 enters the ASC state or the SD state when the speed of the motor 30 is, for example, 4,000 rpm or greater.

When it is determined that the voltage state of the motor 30 is a non-battery relay state, normal torque control continues when a torque control command is sent from the VCU.

When it is determined that the voltage state of the motor 30 is the non-battery relay state, when a fail-safe control command is sent from the VCU, it is further determined what failure state has occurred.

In the first case, when a resolver failure occurs, the inverter device 10 is forced to always perform the ASC control.

In the second case, when an abnormality occurs in a high-voltage power source 13, the inverter device 10 starts the fail-safe control when the speed of the motor 30 is 4,000 rpm or greater, and the inverter device 10 ends the fail-safe control when the speed of the motor 30 is 30,000 rpm or lower.

In the third case, when a failure other than the resolver failure and BECM CAN abnormality occurs, such as CPU abnormality, IGBT device abnormality, power source IC abnormality, current sensor abnormality, etc., the inverter device 10 switches to start the fail-safe control when the speed of the motor 30 is greater than a determination condition 1 to be described in the following paragraphs, and the inverter device 10 switches to end the fail-safe control when the speed of the motor 30 is lower than a determination condition 2 to be described in the following paragraphs.

Further, when the torque control command and the fail-safe control command are not sent from the VCU of the motor 30, the inverter device 10 switches to start the fail-safe control when the speed of the motor 30 is equal to or greater than the determination condition 1 to be described in the following paragraphs, and the inverter device 10 switches to end the fail-safe control when the speed of the motor 30 is equal to or lower than the determination condition 2 to be described in the following paragraphs.

Next, the determination condition 1 and the determination condition 2 regarding the speed of the motor are described as follows.

The determination condition 1 corresponds to the "minimum speed" provided in the claims of the disclosure, and a threshold speed $\omega a$ of the motor that satisfies the determination condition 1 is calculated according to the equation 1.

As described above, after the controller 230 performs the fail-safe control, the speed calculator 130 in the controller 120 calculates the minimum speed of the motor 30 and ends the fail-safe control when the speed of the motor 30 is less than the minimum speed.

Further, the determination condition 2 corresponds to the "maximum speed" provided in the claims of the disclosure, and a threshold speed $\omega b$ of the motor that satisfies the determination condition 2 is calculated according to the equation 1.

As described above, the speed calculator 130 in the controller 120 calculates the maximum speed of the motor 30 based and starts to perform the fail-safe control when the speed of the motor 30 is greater than the maximum speed.

In this way, according to the inverter device provided by the disclosure, the speed range of the motor 30 in which the fail-safe control is performed is narrowed, and the fail-safe control is prevented from being excessively executed. Further, the DC power source 20 and the motor 30 are prevented from being damaged, and the brake torque is also prevented from being generated.

Figure 3:
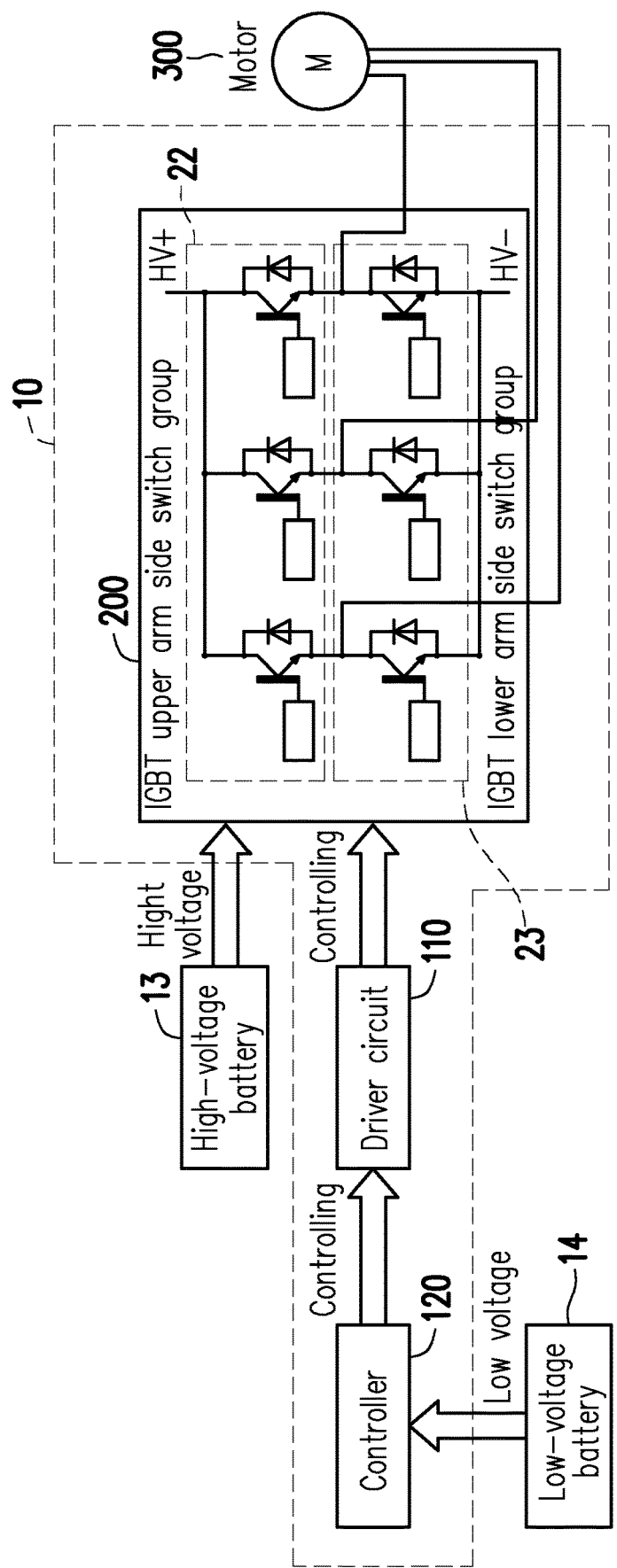
FIG. 3 is a schematic diagram illustrating the entire structure of the motor device in fail-safe control according to the disclosure.
Figure 4:
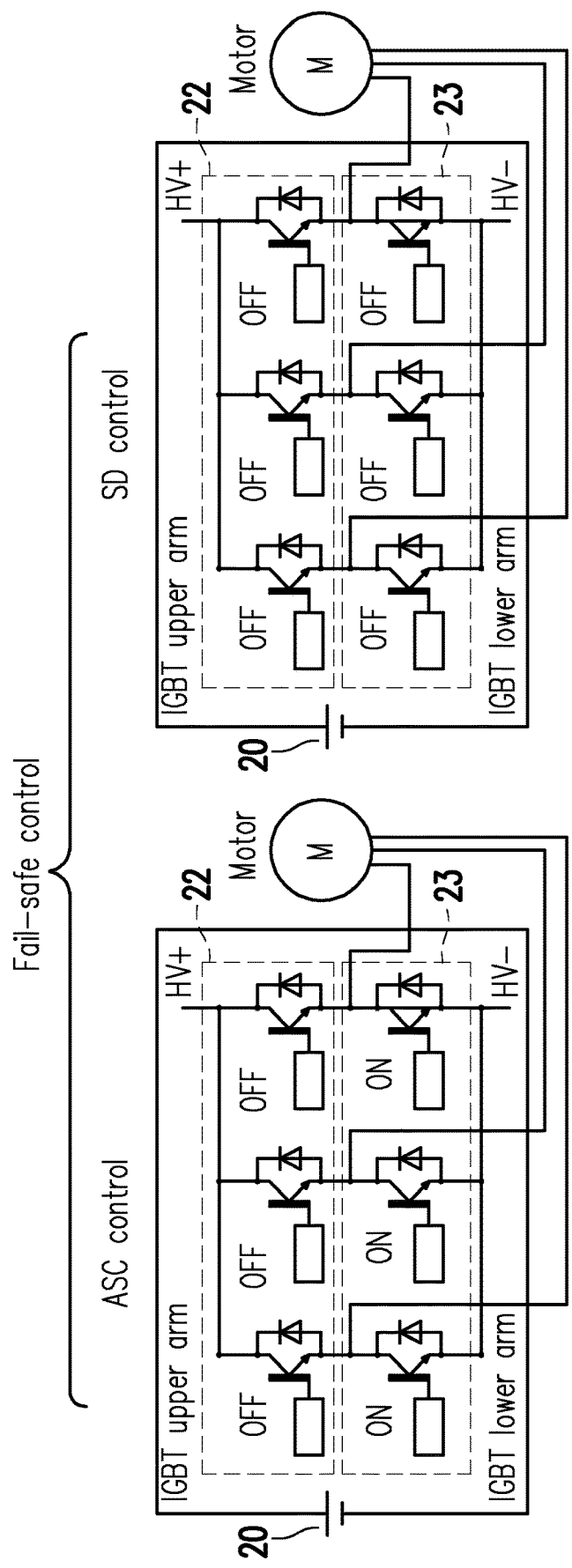
FIG. 4 is a schematic diagram illustrating active short circuit (ASC) control and shut down (SD) control in the fail-safe control according to the disclosure.

FIG. 3 is a schematic diagram illustrating the entire structure of the motor device in fail-safe control according to the disclosure. FIG. 4 is a schematic diagram illustrating active short circuit (ASC) control and shut down (SD) control in the fail-safe control according to the disclosure.

As shown in FIG. 3, an inverter circuit 200 includes the upper arm side switch group 22 and the lower arm side switch group 23. A DC power source 13 (e.g., the high-voltage battery that is shown) provides a high voltage to the inverter circuit 200, and a low-voltage power source 14 (e.g., the low-voltage battery that is shown) provides a low voltage to the controller 120. The driver circuit 110 supplies power through a control circuit including the controller 120. The controller 120 controls the driver circuit 110. Herein, IGBTs are adopted as the switches in the upper arm side switch group 22 and the lower arm side switch group 23, but the disclosure is not limited thereto.

The controller 120 performs on-off control of the switches included in the upper arm side switch group 22 and the lower arm side switch group 23 through the driver circuit 110. According to the control process described above, when a speed of a motor 30 does not exceed the threshold, the controller 120 performs the normal torque control. That is, the on-off of the six switches of the upper arm side switch group 22 and the lower arm side switch group 23 in the inverter circuit 200 is controlled, so that the inverter circuit 200 converts the DC power stored in a high-voltage battery 13 into the three-phase AC power and provides the converted three-phase AC power to the motor 300.

When the speed of the motor 300 exceeds the threshold, the controller 120 ends the normal torque control and starts to execute the fail-safe control.

As shown in the left part of FIG. 4, the fail-safe control described above is the ASC control in which one of the upper arm side switch group 22 and the lower arm side switch group 23 is turned on in all phases and the other is turned off in all phases. By adopting the ASC control, the CEMF generated in the motor is able to be recirculated, so the power source is prevented from being overcharged, and failure of the switches and the power source is prevented from occurring.

In addition, as shown in the right part of FIG. 4, the fail-safe control described above may also be the SD control in which both the upper arm side switch group 22 and the lower arm side switch group 23 are turned off in all phases.

By adopting the SD control, failure of the switches and the power source is prevented from occurring.

When the motor rotates at a high speed, the motor overheats. When the speed of the motor is reduced by the ASC control so that the motor rotates at a low speed, the motor is suddenly brought into a state where the brake torque is applied. In order to prevent the above situation, in the disclosure, when the speed is returned to a low level, the fail-safe control is ended. According to the inverter device provided by the disclosure, the fail-safe control (ASC control or SD control) is performed when the motor rotates at a high speed, and failure of the switches and the power source is prevented from occurring in this way.

The inverter device and the motor device including the inverter device according to the disclosure may be widely applied in fields such as motors of electric vehicles (EVs).

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An inverter device, converting power from a power source and driving a motor, wherein
the inverter device comprises:
an inverter circuit having a switch;
a driver circuit used to switch the switch on and off; and
a controller used to control the driver circuit,
wherein the controller has a speed calculator used to calculate a minimum speed of the motor based on a power source voltage,
the inverter circuit comprises an upper arm side switch group and a lower arm side switch group,
the controller controls the driver circuit to switch on and to switch off the upper arm side switch group and the lower arm side switch group,
wherein after the controller performs a fail-safe control, the fail-safe control is ended when a speed of the motor is less than the minimum speed,
wherein the fail-safe control is an active short circuit (ASC) control in which one of the upper arm side switch group and the lower arm side switch group is turned on in all phases and the other is turned off in all phases, or a shut down (SD) control in which both the upper arm side switch group and the lower arm side switch group are turned off in all phases.

2. The inverter device according to claim 1, wherein
the speed calculator calculates a maximum speed of the motor according to the power source voltage, and
the controller performs the fail-safe control when the speed of the motor is greater than the maximum speed.

3. The inverter device according to claim 1, wherein
the speed calculator calculates the maximum speed and the minimum speed according to the power source voltage, a correction coefficient, and an offset value.

4. A motor device, comprising the inverter device according to claim 1.

5. The inverter device according to claim 1, wherein the power source voltage is from a direct current power source.

6. The inverter device according to claim 3, wherein
the correction coefficient and the offset value are fixed values that vary depending on types of the motor and the power source.

* * * * *